(12) United States Patent
Pedersen et al.

(10) Patent No.: US 9,111,121 B2
(45) Date of Patent: ***Aug. 18, 2015

(54) METHOD AND APPARATUS FOR SECURING A PROGRAMMABLE DEVICE USING A KILL SWITCH

(71) Applicant: Altera Corporation, San Jose, CA (US)

(72) Inventors: Bruce B. Pedersen, Sunnyvale, CA (US); Dirk A. Reese, Campbell, CA (US); Juju Joyce, Sunnyvale, CA (US)

(73) Assignee: Altera Corporation, San Jose, CA (US)

( * ) Notice: Subject to any disclaimer, the term of this patent is extended or adjusted under 35 U.S.C. 154(b) by 118 days.

This patent is subject to a terminal disclaimer.

(21) Appl. No.: 13/913,355

(22) Filed: Jun. 7, 2013

(65) Prior Publication Data

US 2013/0271178 A1      Oct. 17, 2013

Related U.S. Application Data

(63) Continuation of application No. 13/097,816, filed on Apr. 29, 2011, now Pat. No. 8,461,863.

(51) Int. Cl.
*G06F 21/76* (2013.01)
*G06F 21/55* (2013.01)
*G06F 21/75* (2013.01)

(52) U.S. Cl.
CPC .............. *G06F 21/76* (2013.01); *G06F 21/554* (2013.01); *G06F 21/75* (2013.01); *G06F 2221/2143* (2013.01)

(58) Field of Classification Search
CPC ... G01R 31/31719; G06F 21/72; G06F 21/75; G06F 2217/66; G06F 12/1408; G06F 21/76; G11C 16/22; G11C 7/24; G11C 16/225; H03K 19/17768

USPC ............ 326/8–15, 37–40; 713/100, 189, 191, 713/194; 380/278–285

See application file for complete search history.

(56) References Cited

U.S. PATENT DOCUMENTS

| | | |
|---|---|---|
| 4,609,986 A | 9/1986 | Hartmann et al. |
| 4,617,479 A | 10/1986 | Hartmann et al. |
| 4,677,318 A | 6/1987 | Veenstra |
| 4,713,792 A | 12/1987 | Hartmann et al. |
| 4,774,421 A | 9/1988 | Hartmann et al. |
| 4,871,930 A | 10/1989 | Wong et al. |
| 4,899,067 A | 2/1990 | So et al. |
| 4,912,342 A | 3/1990 | Wong et al. |
| 5,033,084 A | 7/1991 | Beecher |
| 5,081,675 A | 1/1992 | Kittirutsunetorn |
| 5,121,006 A | 6/1992 | Pedersen |

(Continued)

OTHER PUBLICATIONS

"Operating Requirements for Altera Devices," Altera, Data Sheet, Version 9.02, pp. 1-14 (Dec. 1999).

(Continued)

*Primary Examiner* — Vibol Tan
(74) *Attorney, Agent, or Firm* — Ropes & Gray LLP

(57) ABSTRACT

A kill switch is provided that, when triggered, may cause the programmable logic device (PLD) to become at least partially reset, disabled, or both. The kill switch may be implemented as a fuse or a volatile battery-backed memory bit. When, for example, a security threat is detected, the switch may be blown, and a reconfiguration of the device initiated in order to zero or clear some or all of the memory and programmable logic of the PLD.

17 Claims, 3 Drawing Sheets

(56) References Cited

U.S. PATENT DOCUMENTS

| | | | |
|---|---|---|---|
| 5,220,214 A | 6/1993 | Pedersen | |
| 5,260,610 A | 11/1993 | Pedersen et al. | |
| 5,260,611 A | 11/1993 | Cliff et al. | |
| 5,350,954 A | 9/1994 | Patel | |
| 5,371,422 A | 12/1994 | Patel et al. | |
| 5,388,157 A | 2/1995 | Austin | |
| 5,406,627 A | 4/1995 | Thompson et al. | |
| 5,450,022 A | 9/1995 | New | |
| 5,479,512 A | 12/1995 | Weiss | |
| 5,513,262 A | 4/1996 | van Rumpt et al. | |
| 5,535,168 A * | 7/1996 | Yepez et al. | 365/227 |
| 5,548,228 A | 8/1996 | Madurawe | |
| 5,563,592 A | 10/1996 | Cliff et al. | |
| 5,581,198 A | 12/1996 | Trimberger | |
| 5,581,202 A | 12/1996 | Yano et al. | |
| 5,636,281 A | 6/1997 | Antonini | |
| 5,768,372 A | 6/1998 | Sung et al. | |
| 5,915,017 A | 6/1999 | Sung et al. | |
| 6,181,164 B1 | 1/2001 | Miller | |
| 6,314,550 B1 | 11/2001 | Wang et al. | |
| 6,608,792 B2 * | 8/2003 | Pitts | 365/225.7 |
| 6,651,155 B1 | 11/2003 | Bocchino et al. | |
| 6,980,649 B1 | 12/2005 | Batcher | |
| 7,009,419 B2 | 3/2006 | Goodman | |
| 7,046,570 B1 | 5/2006 | Hubbard | |
| 7,236,007 B1 | 6/2007 | Chang | |
| 7,368,935 B2 | 5/2008 | Bernier et al. | |
| 7,536,559 B1 | 5/2009 | Jenkins et al. | |
| 7,676,355 B1 | 3/2010 | Molson et al. | |
| 7,844,997 B2 | 11/2010 | Tucker et al. | |
| 8,026,746 B1 | 9/2011 | Nguyen | |
| 8,159,259 B1 | 4/2012 | Lewis et al. | |
| 8,184,812 B2 | 5/2012 | Margolis et al. | |
| 8,255,620 B2 * | 8/2012 | Frost et al. | 711/103 |
| 8,255,700 B2 | 8/2012 | Kitariev et al. | |
| 8,502,555 B1 * | 8/2013 | Peterson et al. | 326/8 |
| 2009/0164727 A1 | 6/2009 | Penton et al. | |
| 2011/0078379 A1 | 3/2011 | Iida et al. | |
| 2012/0278906 A1 | 11/2012 | Pedersen | |

OTHER PUBLICATIONS

Minnick, R.C., "A Survey of Microcellular Research," *Journal of the Association for Computing Machinery*, vol. 14, No. 2, pp. 203-41 (Apr. 1967).

Mukhopadhyay, A., "Recent Developments in Switching Theory," *Academic Press*, New York, Chapters VI and IX, pp. 229-54 and 369-422 (1971).

Plummer, James D. et al., "Silicon VLSI Technology: Fundamentals, Practice and Modeling," *Prentice Hall, Upper Saddle River*, New Jersey, pp. 466-468. (2000).

Wahlstrom, S.E., "Programmable logic arrays-cheaper by the millions," *Electronics*, pp. 90-95 (Dec. 11, 1967).

* cited by examiner

METHOD AND APPARATUS FOR SECURING A PROGRAMMABLE DEVICE USING A KILL SWITCH

CROSS-REFERENCE TO RELATED APPLICATIONS

This application is a continuation of U.S. patent application Ser. No. 13/097,816, filed Apr. 29, 2011 know U.S. Pat. No. 8,461,863), the disclosure of which is hereby incorporated by reference herein in its entirety.

BACKGROUND OF THE DISCLOSURE

Programmable logic devices that store their configuration data in static random access memory ("SRAM") storage are prevalent. SRAM storage is volatile; it does not retain its contents when power is lost. Therefore, programmable logic devices based on SRAM technology are used with nonvolatile storage, to retain the configuration programming data during times that the device is switched of or otherwise not provided with power. However, a competitor may monitor the data flowing out of the nonvolatile storage on power-up, and thereby determine the programming configuration of the programmable logic device. Indeed, the competitor need not even analyze the data stream, but need only record it and store it in its own devices.

Some devices that store configuration programming data in nonvolatile memory components have security features (e.g., encryption/decryption) to protect sensitive data. Unfortunately, an unauthorized user may sometimes circumvent these security features and access the sensitive information.

SUMMARY OF THE DISCLOSURE

The present disclosure relates to securing programmable devices (e.g., programmable logic devices (PLDSs)) using a kill switch. A kill switch may be implemented using, for example, a kill fuse, a non-volatile memory bit, or a volatile battery-backed memory bit. In response to a detected security threat, for example, the kill switch may be blown, causing at least part of the device to be reset, disabled, or both. In some embodiments, the device's configuration circuitry and/or decryption circuitry is permanently disabled in response to a detected security threat.

In some embodiments, blowing the kill switch (i.e., switching the kill switch to a particular state) may cause a particular kill sequence to execute. A kill sequence may be defined by a user design implemented in the respective PLD. For example, for PLDs that store decryption keys, a kill sequence may cause the keys to be cleared or zeroed. A kill sequence may cause any configuration data stored in the PLD configuration memory (e.g., CRAM) to be removed as well as resetting some or all of the logical connections in the PLD that implement a current user design. It will be understood that the kill sequence may at least partially reset, clear, zeroize, disable, or both any suitable portion of the PLD. Multiple kill sequences may be defined and the particular kill sequence executed may be based on the particular trigger associated with each respective kill sequence.

BRIEF DESCRIPTION OF THE DRAWINGS

Further features of the disclosure, its nature and various advantages will be apparent upon consideration of the following detailed description, taken in conjunction with the accompanying drawings, in which like reference characters refer to like parts throughout, and in which.

DETAILED DESCRIPTION

Figure 1:
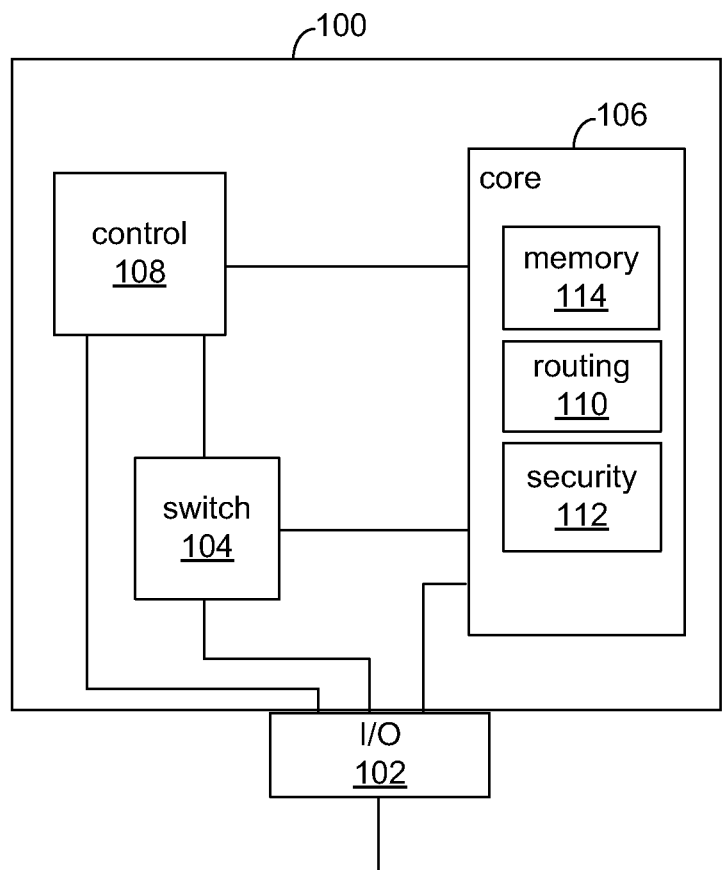
FIG. 1 is a block diagram of an illustrative programmable logic device in accordance with some embodiments.

FIG. 1 shows an illustrative programmable logic device (PLD) 100 as an example of a programmable device in which the present disclosure may be implemented. It will be understood that the present disclosure may be applied to any suitable programmable device, including field programmable gate array (FPGA) devices or any other type of PLDs. PLD 100 may include core configuration fabric 106, which may include any suitable software, circuitry, or both for storing and implementing a user design in PLD 100. This may include, for example, any suitable programmable logic implemented using any suitable technology for memory (e.g., configuration RAM (CRAM)) and programmable logic (e.g., logic array blocks), digital signal processing (DSP) circuitry with hard-wired logic (e.g., multiply-accumulate circuits), any other suitable hardware, software, or both, or any combination thereof. SRAM, for example may be used to store configuration data.

I/O circuitry 102 may include one or more ports that provide data input, output, or both for PLD 100. For example, I/O circuitry 102 may include one or more JTAG ports and one or more ports made available for inputting programming object file (POF) bit-streams. I/O circuitry 102 may be coupled to core configuration fabric 106, control block 108, to any other suitable component of PLD 106, or to any combination thereof.

Control block 108 may include any suitable software, circuitry or both for coordinating and controlling the configuration of PLD 100, and for maintaining security of PLD 100. Control block 108 may be coupled to I/O circuitry 102, kill switch 104, any other suitable component of PLD 100 (e.g., core configuration fabric 106 or a component, such as programmable routing 110), or any combination thereof.

In some embodiments, in order to avoid unauthorized access or use of PLD 100, such as access to the user design implemented in core configuration fabric 106 (and stored in memory 114 (e.g., CRAM)), PLD 100 may include security features. For example, as Illustrated in FIG. 1, PLD 100 may include security module 112. Security module 112 may be any suitable software, hardware or both that implements security features preventing unauthorized use or access of PLD 100. Security module 112 may be, for example, a user-designed component that is implemented in core configuration fabric 106. Alternatively, security module 112 may be part of vendor-provided proprietary configuration data for various commonly-used functions that is either preloaded in PLD 100 by the manufacturer or loaded in PLD 100 by the user. Whether loaded by the user or by the manufacturer, security module 112 may be customizable by the user as part of, for example, the user design implementation. As illustrated, security module 112 is part of core configuration fabric 106. It will be understood that security module 112 may be implemented as part of any other suitable component of PLD 100, such as in control block 108, or may be a stand-alone component.

Security module 112 may allow the user to define a trigger that causes a kill switch 104 to be activated. Kill switch 104 may be a non-volatile element, mechanism, or both, or a volatile battery-backed element, for disabling functionality of a programmable device. For example, in some embodiments, a user design, via security module 112, may be given the capability to detect a security threat and to initiate a kill sequence by activating kill switch 104. A security threat may be detected based on any suitable criteria. Any of the kill switch 104 and the elements of the kill sequence (e.g., resetting, altering, clearing, zeroizing, etc.) may be user-programmable.

In one suitable approach, kill switch 104 may be at least partially implemented using a physical kill fuse. A kill fuse may be any suitable fuse, such as an non-volatile (NV) fuse. In another approach, kill switch 104 may be at least partially implemented using a battery-backed volatile memory. Kill switch 104 may create one or more necessary connections in order for PLD 100 to be configured, to be reconfigured, to properly function, or any combination thereof. For example, when PLD 100 is in configuration mode, control block 108 (or any other suitable component) may check kill switch 104 continuously to ensure that kill switch 104 has not been blown. If a blown kill switch 104 is detected, control block 108 may prevent any configuration or reconfiguration of PLD 100. A blown kill switch 104 may also, or in the alternative, cause any suitable reset, clearing, or zeroization (i.e., clearing and verification of clearing) of certain or all memory and/or logic components of PLD 100. For example, some or all of the contents of memory 114, which may hold user configuration data, may be removed, replaced with random data, or zeroed, to name a few.

PLD 100 may be killed (e.g., kill switch 104 blown) when, for example, a security threat is detected by a user design element of core configuration fabric 106 (e.g., security module 112) or by control block 108. For purposes of brevity and clarity and not by way of limitation, the present disclosure is described in terms of the security module 112 detecting a security threat and blowing kill switch 104. It will be understood that any other suitable elements or combination of elements may detect a security threat and kill PLD 100.

Figure 2:
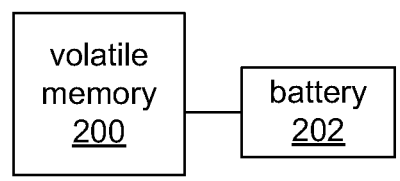
FIG. 2 is a block diagram of battery-powered volatile memory in accordance with some embodiments.

In some embodiments, a programming object file (POF) bit-stream or any other suitable configuration data used to configure or reconfigure PLD 100 may be encrypted (e.g., using an AES encryption protocol). In order to decrypt the configuration data, PLD 100 may use a decryption key. As illustrated in FIG. 2, the decryption key may be stored in PLD 100 using volatile memory 200 coupled to battery 202. When PLD 100 is turned off, battery 202 prevents the contents of volatile memory 200 from being erased. Volatile memory 200 may be implemented in control block 108, in core configuration fabric 106, in any other suitable element of PLD 100, or in any combination thereof. Volatile memory may be any suitable memory device, such as, for example, SRAM, DRAM, any other suitable volatile memory, or any combination thereof.

In some embodiments, when security module 112 detects a threat and activates kill switch 104, the subsequent kill sequence may involve clearing the contents of volatile memory 200. Thus, the decryption key may be cleared or zeroed (i.e., memory content replaced with known and non-classified content) upon the detection of a security threat. This will prevent configuration or reconfiguration of PLD 100. A decryption key may also or alternatively be stored in non-volatile memory.

Figure 3:
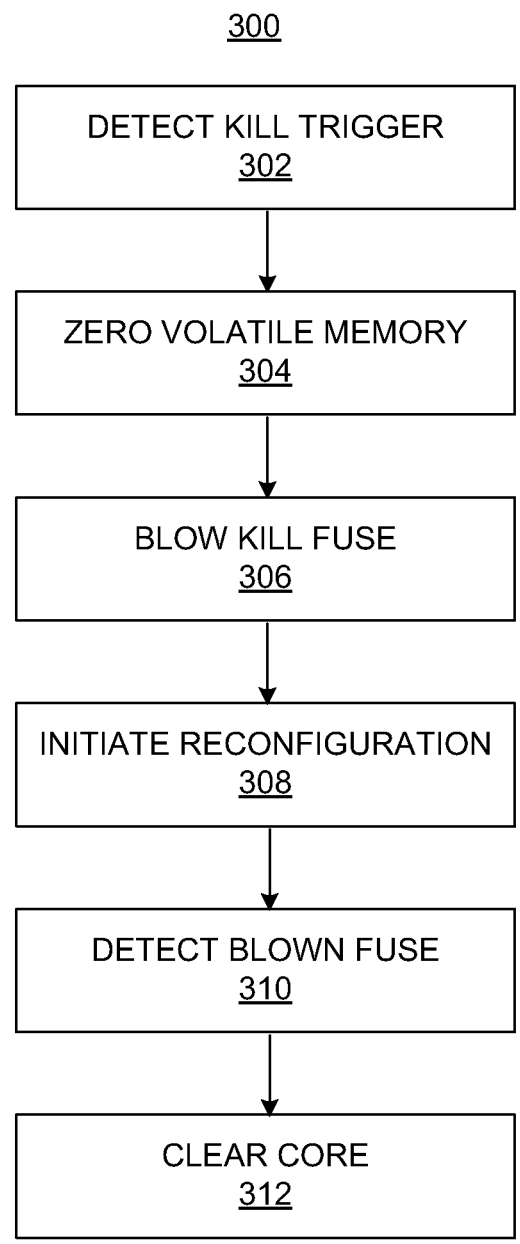
FIG. 3 is a flow chart of illustrative steps of a device kill sequence in accordance with some embodiments.

FIG. 3 shows a flow chart 300 of illustrative steps of a kill sequence in some embodiments. At step 332, security module 112 may detect a security threat that acts as a kill trigger. Any suitable criteria for a security threat may be used.

At step 304, in response to the detection of a kill trigger, security module 112, control block 108, or both may zero or clear a volatile decryption key stored in volatile memory (e.g., volatile memory 200). It is appreciated that the terms clearing or zeroing content refer to replacing the content with some other data, e.g., random data, known data, etc., other than the current data and not necessarily replacing the current data with data value zero.

At step 306, in response to the detection of a kill trigger, security module 112, control block 108, or both may blow kill switch 104.

At step 308, control block 108 may initiate reconfiguration of PLD 100. That is, PLD 100 is set to configuration mode (as opposed to user mode). As part of the reconfiguration sequence, control block 108 may continuously check kill switch 104. Under normal circumstance when no kill trigger has been detected and PLD 100 is in configuration mode, control block 108 may continue the normal configuration sequence in which configuration data is loaded from the POF bit-stream and core configuration fabric is programmed according to the configuration data.

However, if, at step 310, kill switch 104 is determined to have been blown, then control block 108 may clear core configuration fabric 106 at step 312. This clearing may effectively initialize the configuration fabric to, for example, a default state (e.g., logic array blocks and corresponding programmable connections in core configuration fabric 106 may be initialized, memory 114 may be cleared, and any other configuration data or user design data may be removed). Either as part of step 304, step 308, or step 312 (or as one or more separate steps), control block 108 may, in response to the kill trigger tri-state I/O circuitry 102 (or otherwise disable I/O circuitry 102), disable any other suitable functionality of PLD 100, including, for example, any configuration engine that may be used to configure the device. In some embodiments, a decryption engine included in PLD 100 is disabled in response to the kill trigger. One advantage of disabling the decryption engine is that side-channel attacks on the decryption engine (such as simple power analysis (SPA) or differential power analysis (DPA)) may be prevented, since such attacks typically require the decryption engine to be exercised. In particular, even if the main power supply of PLD 100 is interrupted before the volatile battery-backed key is fully cleared, disabling the decryption engine prevents an attacker from accessing the key using side-channel attacks.

When kill switch 104 is blown or when a kill sequence (e.g., kill sequence 300) is executed, PLD 100 may be permanently deactivated by virtue of the terminated connection of kill switch 101, or disablement of other components or features of PLD 100. In some embodiments, PLD 100 may be configured to allow a reset by an authorized user to be functional even following the execution of a kill sequence (for example, when kill switch 104 is implemented as battery-backed volatile memory). In some such embodiments, kill switch 104 is implemented as a "sticky bit," which are discussed in detail below. To re-enable PLD 100 after a volatile kill switch is blown, the kill switch may be fully cleared. Data stored in the PLD 100, including the key, may also be cleared.

It will be understood that kill sequence 300 is merely illustrative. Any other suitable steps may be performed in addition to or in place of those shown. Any suitable modifications may be made to kill sequence 300 and it will be understood that the order presented is merely illustrative. It will be further understood that PLD 100 may implement multiple kill sequences each associated with a respective trigger. Therefore, different triggering events may cause one or more different kill sequences to execute.

In some embodiments, fuse bits may be cleared as part of the kill sequence by blowing corresponding fuses. For example, in some designs of PLD 100, instead of using volatile decryption keys (i.e., stored in volatile memory 200 (FIG. 2) powered by battery 202), one or more keys may be stored using permanent fuse bits. When a security threat causes a kill switch to be activated, as part of the kill sequence, some or all fuse bits may be permanently cleared by blowing the corresponding fuses thus removing any stored key value. Fuse key bits may also be cleared and verified upon detection of a security threat without blowing kill switch 104. In less critical threat scenarios, a user design in PLD 100 may clear the fuse key bits, but not "kill" the entire PLD 100. Fuse keys may be used in place of volatile keys in situations where, for example, operational conditions, product shelf-life, or maintenance requirements would not accommodate the use of a battery and volatile memory to store keys. It will be understood that any suitable fuses may be used in this approach (e.g., NV fuses). If desired, a verification that the fuse bits have been successfully cleared may be performed when clearing any fuse bits (or when clearing any data from any components of PLD 100 as part of the kill sequence) which may involve, for example, the use of built-in read back and verification routines. If the fuse bits (or other data) was not successfully cleared, the clear and vertification routines may be repeated.

As discussed above, any suitable security threats may be identified and used to trigger the kill switch and associated kill sequence. In one suitable approach, the use of security option bits representative of particular security threats may be used to identify a security threat and to trigger a device clear or kill sequence. The security option bits may take the form of, for example, sticky bits. Sticky bits may be stored in PLD 100 using volatile memory powered by a battery. For example, referring to FIG. 2, sticky bits may be stored in volatile memory 200, which is powered by battery 202. Sticky bits may be stored in control block 108 or in any other suitable component of PLD 100. As discussed above, volatile memory 200 may also store a decryption key associated with PLD 100. It will be understood that sticky bits and key bits may be stored separately or together on the same or on different memory devices powered by the same or different batteries.

In one suitable approach, sticky bits may be stored in multiple copies on PLD 100 (e.g., in triplicate) and may be backed up using a shadow register powered by core configuration fabric 106. If any of the sticky bits are set high, the corresponding other bits would be forced high as well. Cycling only one of the power supplies would restore the value in the register that was cycled from a corresponding register that was not cycled.

Sticky bits may be used to set any of a multitude of security options. They may also be used to test whether particular security threats exist. For example, in one suitable approach, sticky bits stored in PLD 100 may be compared to corresponding security option bits being transmitted in the POF. Because the sticky bits stored in PLD 100 are of a fixed pattern (i.e., they cannot be modified except when reconfiguring PLD 100), one suitable security threat check may involve comparing the sticky bit pattern to a security bit pattern in the POF. If there is a mismatch, then the decryption key may be cleared or zeroed, or a device kill sequence may be triggered.

In some embodiments, security option bits, such as sticky bits or bits received from the POF, stored in PLD 100 may be checked or monitored to ensure that their respective values have not been modified (e.g., as result of radiation, a security threat, any other suitable cause, or any combination thereof). If one or more of the security option bits stored in PLD 100 is determined to have been altered, then the decryption key may be cleared or zeroed, or a device kill sequence may be triggered. A determination of whether any of the security option bits may have been altered may be made using any suitable technique, such as, for example, by computing a checksum (e.g., CRC) value and comparing it to a stored (i.e., expected) value.

Security option bits, including sticky bits, are further discussed in U.S. patent application Ser. Nos. 13/098,074 and 13/098,316 filed on even date herewith and which are both hereby incorporated by reference herein in their entireties.

In some embodiments, a volatile key (or any other type of key) may be cleared or zeroed according to a particular time elapsing. For example, when programming the key, the user design may indicate that the volatile key is to be automatically zeroed after a certain period of time from the programming of the key. The time may be determined from a real time clock powered by a battery. This may prevent any subsequent attempts to reconfigure the PLD (e.g., if only a single configuration operation of the PLD is intended). The time may be calculated from any suitable start point and does not need to be from the time the key is initially programmed. For example, the zeroing may automatically occur after a certain period of time elapses since a security threat had been identified by security module 112, control block 108, or both.

Figure 4:
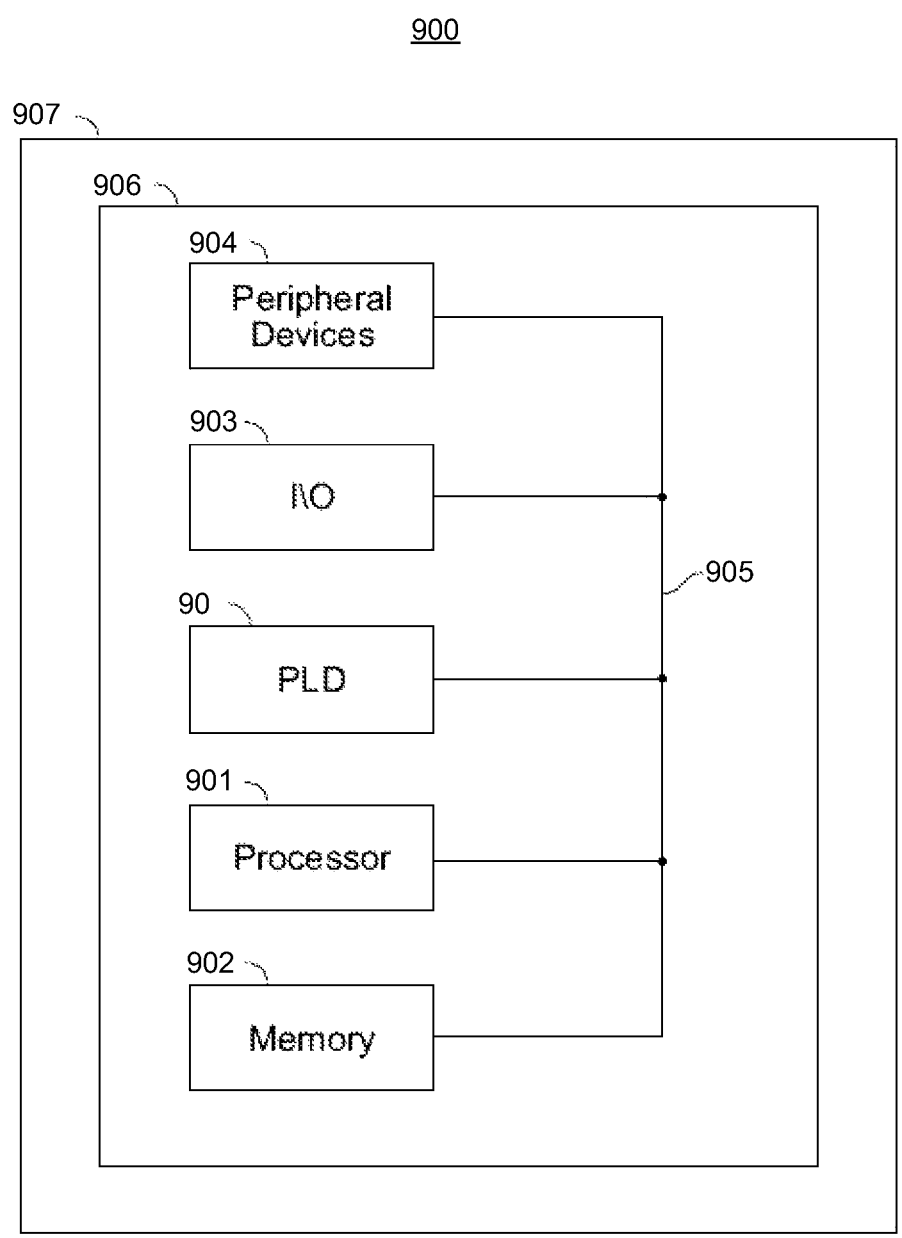
FIG. 4 is a block diagram of an illustrative system incorporating a programmable logic device in accordance with some embodiments.

A PLD 90 programmed according to any embodiment of the present disclosure may be used in many kinds of electronic devices. One possible use is in a data processing system 900 shown in FIG. 4. Data processing system 900 may include one or more of the following components: a processor 901; memory 902; I/O circuitry 903; and peripheral devices 904. These components are coupled together by a system bus 905 and are populated on a circuit board 906 which is contained in an end-user system 907.

System 900 can be used in a wide variety of applications, such as computer networking, data networking, instrumentation, video processing, digital signal processing, or any other application where the advantage of using programmable or reprogrammable logic is desirable. PLD 90 can be used to perform a variety of different logic functions. For example, PLD 90 can be configured as a processor or controller that works in cooperation with processor 901. PLD 90 may also be used as an arbiter for arbitrating access to a shared resources in system 900. In yet another example, PLD 90 can be configured as an interface between processor 901 and one of the other components in system 900. It should be noted that system 900 is only exemplary, and that the true scope and spirit of the disclosure should be indicated by the following claims.

Various technologies can be used to implement PLDs 90 as described above and incorporating this disclosure.

It will be understood that the foregoing is only illustrative of the principles of the invention, and that various modifications can be made by those skilled in the art without departing from the scope and spirit of the invention. For example, the various elements of this invention can be provided on a PLD in any desired number and/or arrangement. One skilled in the art will appreciate that the present invention can be practiced by other than the described embodiments, which are presented for purposes of illustration and not of limitation, and the present invention is limited only by the claims that follow.

What is claimed is:

1. A programmable device, comprising:
   a control block;
   a kill switch coupled to the control block, wherein the control block is configured to blow the kill switch in response to an occurrence of an event, wherein blowing the kill switch causes data stored within at least a portion of the programmable device to be changed; and
   a plurality of key fuses for storing fuse bits representing a decryption key, wherein at least one of the key fuses is blown in response to the kill switch being blown.

2. The programmable device of claim 1, wherein the kill switch comprises a fuse.

3. The programmable device of claim 1, wherein at least a portion of the programmable device is disabled in response to the kill switch being blown.

4. The programmable device of claim 1, further comprising I/O circuitry, wherein the I/O circuitry is disabled in response to the kill switch being blown.

5. The programmable device of claim 1, further comprising decryption circuitry, wherein the decryption circuitry is disabled in response to the kill switch being blown.

6. The programmable device of claim 1, further comprising:
   a battery; and
   volatile memory coupled to the battery for storing a decryption key, wherein data stored within the volatile memory is changed in response to the kill switch being blown.

7. A programmable device, comprising:
   I/O circuitry;
   a kill switch, wherein the kill switch is blown in response to an occurrence of an event, wherein the I/O circuitry is disabled in response to the kill switch being blown; and
   a plurality of key fuses for storing fuse bits representing a decryption key, wherein at least one of the key fuses is blown in response to the kill switch being blown.

8. The programmable device of claim 7, wherein the kill switch comprises a fuse.

9. The programmable device of claim 7, wherein at least a portion of the programmable device is disabled in response to the kill switch being blown.

10. The programmable device of claim 7, further comprising decryption circuitry, wherein the decryption circuitry is disabled in response to the kill switch being blown.

11. The programmable device of claim 7, further comprising:
    a battery; and
    volatile memory coupled to the battery for storing a decryption key, wherein data stored within the volatile memory is changed in response to the kill switch being blown.

12. A programmable device, comprising:
    a memory component for storing a decryption key;
    a kill switch, wherein the kill switch is blown in response to an occurrence of an event, wherein the decryption key is cleared in response to the kill switch being blown; and
    a plurality of key fuses for storing fuse bits representing the decryption key, wherein at least one of the key fuses is blown in response to the kill switch being blown.

13. The programmable device of claim 12, wherein the kill switch comprises a fuse.

14. The programmable device of claim 12, wherein at least a portion of the programmable device is disabled in response to the kill switch being blown.

15. The programmable device of claim 12, further comprising I/O circuitry, wherein the I/O circuitry is disabled in response to the kill switch being blown.

16. The programmable device of claim 12, further comprising decryption circuitry, wherein the decryption circuitry is disabled in response to the kill switch being blown.

17. The programmable device of claim 12, further comprising a batter, wherein the memory component comprises volatile memory coupled to the battery, wherein data stored within the volatile memory is changed in response to the kill switch being blown.

* * * * *